US009043376B2

(12) United States Patent  
de Brebisson et al.

(10) Patent No.: US 9,043,376 B2  
(45) Date of Patent: May 26, 2015

(54) CUSTOM CONFIGURATION FOR A CALCULATOR BASED ON A SELECTED FUNCTIONALITY

(75) Inventors: Cyrille de Brebisson, Boise, ID (US); Timothy James Wessman, Ft. Collins, CO (US); Gregory Thorn Springer, Santa Fe, NM (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 314 days.

(21) Appl. No.: 13/601,835

(22) Filed: Aug. 31, 2012

(65) Prior Publication Data

US 2014/0068236 A1 Mar. 6, 2014

(51) Int. Cl.
*G06F 15/02* (2006.01)

(52) U.S. Cl.
CPC .................................... *G06F 15/02* (2013.01)

(58) Field of Classification Search
None
See application file for complete search history.

(56) References Cited

U.S. PATENT DOCUMENTS

| 4,024,386 | A | 5/1977 | Caudel et al. |
| 6,519,641 | B1 | 2/2003 | Siep et al. |
| 8,499,014 | B2 * | 7/2013 | Miller et al. ................ 708/130 |
| 2006/0277233 | A1 * | 12/2006 | Miller et al. ................ 708/160 |
| 2008/0154997 | A1 | 6/2008 | Aton |
| 2009/0115606 | A1 | 5/2009 | Rosenquist |
| 2012/0041993 | A1 * | 2/2012 | Wostrel ........................ 708/130 |
| 2013/0290389 | A1 * | 10/2013 | Miller et al. ................ 708/130 |
| 2014/0068236 | A1 * | 3/2014 | de Brebisson et al. ........... 713/1 |

FOREIGN PATENT DOCUMENTS

KR 20030081743 10/2003

OTHER PUBLICATIONS

Porton, M "Casio's Wireless USB Calculator/Keypad" http://www.engadget.com/2005/09/14/casios-wireless-usb-calculator-keypad/ , Sep. 14, 2005, 5 pages.

* cited by examiner

*Primary Examiner* — David H Malzahn
(74) *Attorney, Agent, or Firm* — Hewlett-Packard Patent Department (57) ABSTRACT

Examples disclose a computing system comprising a computing device with a display surface to detect a selection of functionality from a list of functionalities to be disabled on a calculator. Further, the computing device creates a custom configuration based on the selected functionality. Additionally, the examples also disclose a calculator with a processor to integrate the custom configuration, the custom configuration restricts the selected functionality on the calculator.

15 Claims, 5 Drawing Sheets

CUSTOM CONFIGURATION FOR A CALCULATOR BASED ON A SELECTED FUNCTIONALITY

BACKGROUND

Calculators have increased in popularity due to the sophistication of their functionalities. However, since the calculators have increased in technological sophistication, it has become increasingly difficult to regulate the functionalities during an examination.

BRIEF DESCRIPTION OF THE DRAWINGS

In the accompanying drawings, like numerals refer to like components or blocks. The following detailed description references the drawings, wherein.

DETAILED DESCRIPTION

Educational administrators may have difficulties administering exams to students with calculators due to the increased sophistication of the calculators. One solution is to provide testing configurations that pre-define enabling and disabling functionalities on a per feature basis. In this solution, a configuration is pre-configured according to one or more academic subjects and transmitted from a server or within a network to one or more calculators. However, this solution limits the testing functionalities as it does not allow the administrator to customize the configurations. For example, the testing configurations may include geometry and thus disabling much of the geometry functions in order to test students on their knowledge. In this example, the administrator may want to test the students on a specific aspect of geometry, yet the geometry functions may be disabled not allowing the administrator to tailor the testing configuration. Additionally, this configuration is based on industry standards rather than on classroom standards.

In another solution, the testing administrator configures each calculator by manually disabling and enabling the functionalities on each of the calculators. However, this solution is inefficient as it takes much time and resources for the administrator to manually enable and disable the testing calculators. Additionally, the configuration may not be provided as template to distribute among the calculators, thus making each calculator more susceptible to administrator error and giving unfair advantages to one or more calculators. Further, both of these solutions rely on each student's honesty to verify the calculator is in the testing configuration throughout the duration of the examination. Rather, there is no way to monitor whether each calculator is in the testing configuration mode without the administrator examining each calculator.

To address these issues, example embodiments disclosed herein provide a computing device with a display surface to detect a selection of a functionality from a list of functionalities. The list of functionalities include the features and/or operating functions of the calculator which may be disabled for the calculator to operate in an examination mode. Additionally, the computing device creates a custom configuration based on the selected functionality. Creating the custom configuration, provides an administrator to determine which functionalities to disable on the calculator. This customization allows the administrator to tailor the examination mode of each calculator according to their preferences. These preferences may be mandated per classroom and/or administrator.

Additionally, the calculator integrates the custom configuration of which restricts the selected functionality on the calculator. Integrating the custom configuration provides consistency, saves resources and time as the custom configuration may be integrated on one or more calculators for an examination mode using a wired and/or wireless connection rather than the administrator manually configuring each calculator.

In another embodiment, the computing device may generate a pattern with the custom configuration to monitor the custom configuration on the calculator. Additionally, the calculator emits a notification associated with the pattern to enable the monitoring of the calculator. The notification may include a light emitting diode, visual notification, audio notification, and/or email. Monitoring the custom configuration on the one or more calculators, ensures the calculators are operating in the examination mode without manually examining each calculator. Additionally, the one or more calculators may be monitored from a remote location, thus providing additional flexibility in monitoring the custom configuration.

In a further embodiment, the calculator may exit the custom configuration by performing at least one of entering a password, entering a command, and completing a time period. Each of these embodiments provides additional flexibility for the administrator to control the custom configuration on each calculator.

Yet, in a further embodiment, the selected functionality includes a list of corresponding sub-functionalities for additional selection. Selecting one or more sub-functionalities corresponding to the selected functionality provides another level of customization to further tailor the custom configuration.

In summary, example embodiments disclosed herein provide an educational tool to create a custom configuration for one or more calculators in an examination mode. Further, example embodiments provide a customization which enables an administrator to tailor the examination mode according to the classroom and/or administrator preferences.

Figure 1:
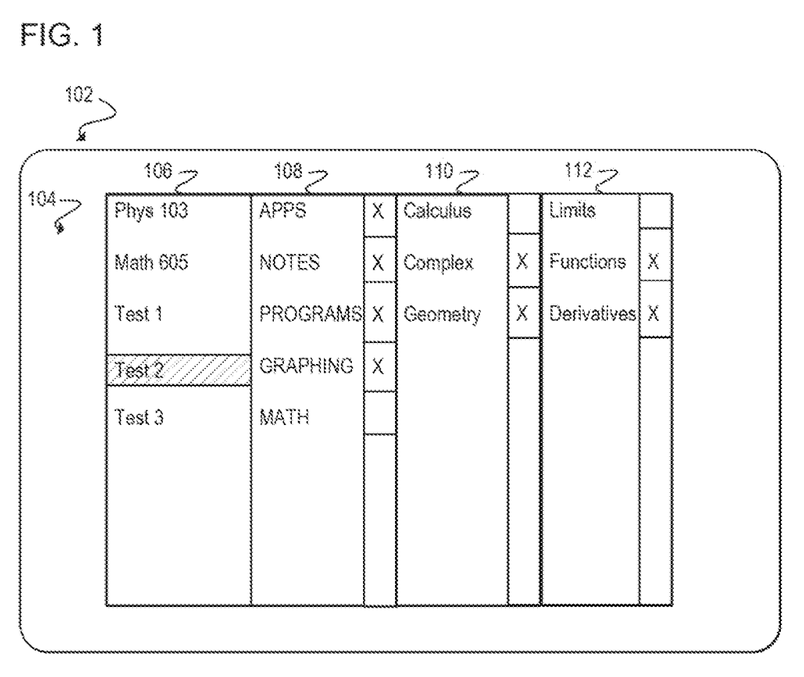
FIG. 1 is a block diagram of an example display on a computing device including a custom configuration, a list of functionalities, and corresponding sub-functionalities to be disabled.

Referring now to the drawings, FIG. 1 is a block diagram for an example display 104 on a computing device 102 including a list of configurations 106, a list of functionalities 108, and corresponding sub functionalities 108 and 110 to be disabled on a calculator. Although FIG. 1 illustrates the list of configurations 106, list of functionalities 108, and corresponding lists of sub-functionalities 110 and 112, embodiments should not be restricted to this illustration, as the display surface 104 may include any single element within the columns 106, 108, 110, and 112 and/or any single column 108, 108, 110, and 112, and/or combination of columns 106, 108, 110, and 112. For example, the display surface 104 may include the list of functionalities 108 to select a single functionality to create a custom configuration for integration on the calculator.

The computing device 102 is an electronic device that is programmed to carry out tasks and/or operations. Specifically, the computing device 102 includes a display surface 104 to detect a selected functionality from a list 108. In another embodiment, the computing device 102 may include a calculator so a custom configuration from the list of configurations 106 may be created on the calculator. In this embodiment, the calculator from which to create the custom configuration operates as a master device while the other calculators, which may integrate the custom configuration, operate as the slave devices. Embodiments of the computing device 102 include the calculator, client device, personal computer, desktop computer, laptop, a mobile device, a tablet, or other computing device suitable to include a display 104 to detect the selection of functionality from a list of functionalities 108 to create the configuration 106.

The display surface 104 provides a type of user interface for selection of the functionality from the list of functionalities 108. Specifically, the display surface 104 provides a type of navigation to select one or more functionalities from the list 108 and/or configuration 106. In another embodiment, the computing device 102 and the display surface 104 comprise an input device with a touch screen and/or key pad for the administrator to navigate to select a functionality to restrict on the calculator. Embodiments of the display surface 104 include a computing screen, touch screen, computing monitor, panel, plasma screen, liquid crystal display (LCD), thin film, projection, or other display technology capable of rendering the configurations 106, the list of functionalities 108, and lists of corresponding sub-functionalities 110 and 112.

The configuration list 106 includes the existing configurations, each configuration represents a different examination mode for the calculator. In one embodiment, the custom configuration may be created and given a user-defined name. For example, "Test 2" may be selected and renamed "Test 4," thus the column 106 will include "Test 4," among the configurations. In another embodiment, the custom configuration may be selected from a list of existing configurations 106 and customized according to an administrator's preferences. For example, "Test 2" may be a pre-existing configuration and customizing this configuration to include preferences of functionalities 108 and sub-functionalities 110 and 112 to be disabled on the calculator. In this embodiment, "Test 2," is selected as indicated with the diagonal lines. Although FIG. 1 depicts the selection of the configuration with diagonal lines, embodiments should not be limited to this illustration. For example, the selection may be highlighted and/or associated with a checkmark, etc.

The functionality list 108 includes one or more functionalities that are selected on the display surface 104 for disablement on the calculator. The functionalities are disabled on the calculator by utilizing a processor within the calculator to restrict the lines of code associated with the selected functionality from execution. For example, the administrator may be testing calculus and thus prefer the students graph their own equations on the examination. Thus, in this example, the administrator may choose "GRAPHING" to disable this functionality. The processor associated with the calculator recognizes the selected functionality to be disabled of "GRAPHING," and restricts the instructions associated with "GRAPHING," from executing. In another example, a notification may appear to the student who may attempt to access that functionality. In one embodiment, the functionalities 108 may include general categories such as "APPS," while in another embodiment, the functionalities 108 may include academic subjects such as "GEOMETRY," "ALGEBRA," etc. In another embodiment, once the selected functionality is detected, a type of notification is presented which enables navigation within that selected functionality. For example, "MATH" is selected from the list 108 and notification is present with the absence of an "X" next to it. Further, in this example, the list of corresponding sub-functionalities is presented to the left of "MATH." This includes "Calculus," "Complex," and "Geometry." Additionally, in this example, corresponding sub-functionalities to the selected sub-functionality "Calculus," is illustrated to the furthest right of the display surface 104. Although FIG. 1 depicts the selection of the functionality from the list 108 with an "X" next to each functionality, embodiments should not be limited to this illustration. For example, the selected functionality may be highlighted and/or associated with a checkmark, etc.

The list of sub-functionalities 110 and 112 correspond to the functionalities 108 and provides a further customization the configuration. The functionality list 108 is a list of features that may be disabled within the calculator based on the examination mode. The sub-functionalities 110 and 112 to select based on selected functionality from the list 108. Such functionalities may include broad categories and/or subjects. As illustrated in FIG. 1, these may include, but should not be limited to "APPS," "MATH," "PROGRAMS," "GRAPHING." In another embodiment, the functionalities may include subjects such as "Calculus," "Complex," "Geometry, "Algebra," etc. The sub-functionalities 110 and 112 are specific areas of concentration and/or types of concentration within the broad categories and/or subjects (i.e., selected functionality). For example, the selected functionality may include "MATH," thus the sub-functionalities 110 and 112 may include the types of math such as "Calculus," "Algebra," etc. In another example, the selected feature may include "Calculus," thus the corresponding sub-functionalities 110 and 112 may include the specific areas within this subject such as "Limits," "Derivatives," "Functions," etc. Selecting one or more sub-functionalities corresponding to the selected functionality provides another level of customization to the custom configuration.

Figure 2:
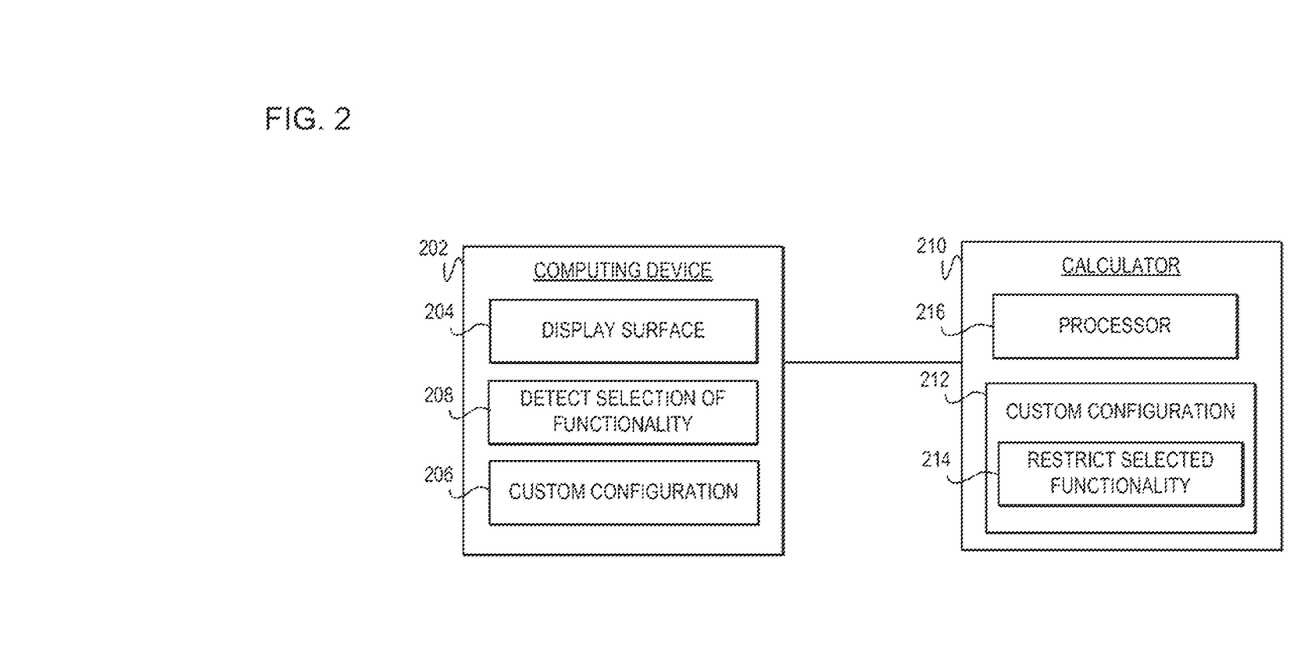
FIG. 2 is a block diagram of an example computing device with a display surface to detect a selection of functionality to create a custom configuration for a calculator, the custom configuration restricts the selected functionality detected on the display surface of the computing device.

FIG. 2 is a block diagram of an example computing device 202 with including a display surface 206 to detect a selection of functionality at module 208 to create a custom configuration for a calculator 210 at module 204. The custom configuration 212 is integrated on the calculator 210 and at module 214, restricts the selected functionality as detected on the computing device 202 at module 208. In one embodiment, the custom configuration 212 may be created and integrated on the same device. For example, the custom configuration 212 may be created and integrated on the calculator 210. In this example, the computing device 202 and the calculator 210 may be part of the same device. In another embodiment, the computing device 202 and the calculator 210 may be separate devices as show in FIG. 2. The computing device 202 and the display surface 206 may be similar in structure and functionality to the computing device 102 as in FIG. 1.

At module 208, the computing device detects the selection of functionality from a list. Embodiments of module 208 include a set of instructions, instruction, process, operation, logic, algorithm, technique, logical function, firmware, and or software executable by the computing device 202 to detect the selected functionality from a list.

At module 206, the computing device creates the custom configuration 212 based on the selected functionality detected at module 208. The custom configuration is saved as a setting and/or configuration to integrate on the calculator 210 to restrict access to one or more functionalities. The custom configuration is of setting and/or configuration which modifies the settings on the calculator 210 to restrict selected functionality for a period of time during an examination. Embodiments of module 206 include a set of instructions, instruction, process, operation, logic, algorithm, technique, logical function, firmware, and or software executable by the computing device 202 to create the custom configuration 212 based on the selected functionality detected at module 208.

The calculator 210 is an electronic device with a processor 216 used to perform tasks and/or operations including mathematical and/or logical basic and complex operations. These tasks are utilized during an examination mode to answer various questions on an exam. For example, these may include but are not limited to graphing, arithmetic functions, geometry functions, calculus functions, algebraic functions, complex operations, etc. As such, the calculator 210 may include a user interface to receive input to perform such functions. However, an examination may test a student's ability to manually perform the functions. As such, restricting the functionality on the calculator 210 allows the examination to test for that particular function. Embodiments of the processor 216 include a controller, microchip, chipset, electronic circuit, microprocessor, semiconductor, microcontroller, central processing unit (CPU), graphics processing unit (GPU), visual processing unit (VPU), or other programmable device capable of executing various tasks such as arithmetical operations within the calculator 210.

The custom configuration 212 is a type of configuration or mode of operation which restricts operations (i.e., functionalities) of the calculator 210 during an examination. The custom configuration 212 is integrated onto the calculator for that examination and is based on the detected selected functionality at module 208. The integration of the custom configuration 212 modifies the settings on the calculator 210 during the examination. In one embodiment, once the custom configuration 214 has been integrated onto the calculator 210 a notification is sent to the computing device 202. In another embodiment, the custom configuration 212 is synchronized onto more than one calculator 210. The custom configuration 212 may be transmitted to the calculator 210 through a wired and/or wireless connection as indicated with the connected line.

At module 214, the custom configuration 212 restricts the selected functionality as detected by the computing device 202 at module 208. Embodiments of module 214 include a set of instructions, instruction, process, operation, logic, algorithm, technique, logical function, firmware, and or software executable by the computing device 202 to restrict the selected functionality detected at module 208.

Figure 3:
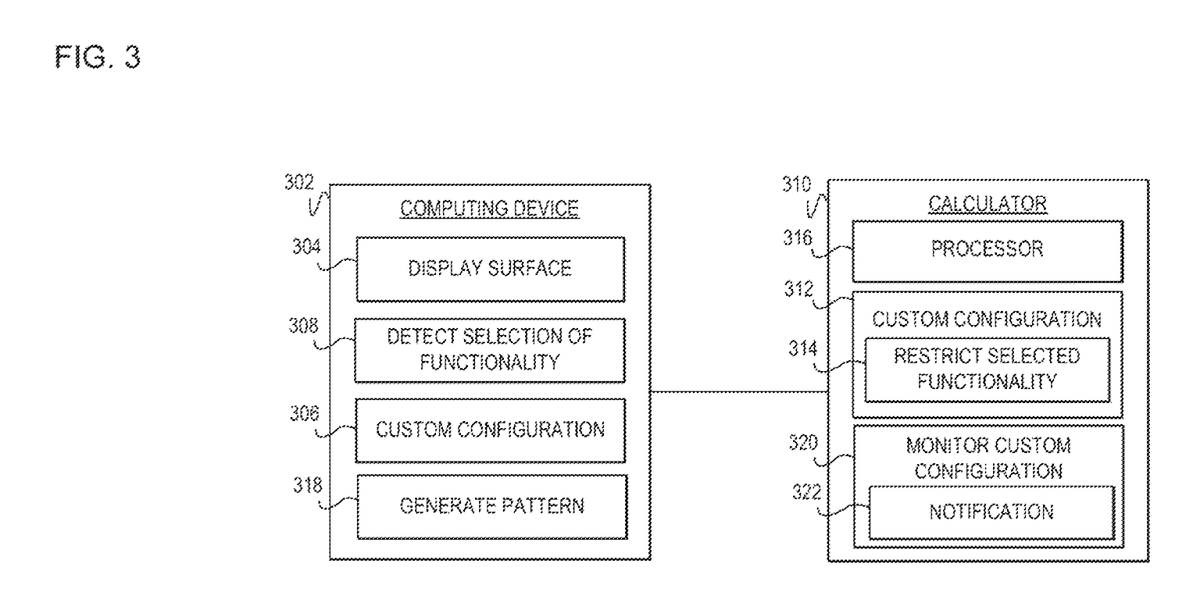
FIG. 3 is a block diagram of an example computing device with a display surface to detect a selection functionality to create a custom configuration for a calculator, the computing device generates a pattern to monitor the custom configuration on the calculator.

FIG. 3 is a block diagram of an example computing device 302 including a display surface 304 to detect a selected functionality at module 308 to create a custom configuration at module 306 for a calculator 310 based on the detected selected functionality at module 308. Additionally, the computing device 302 generates a pattern at module 318 with the creation of the custom configuration at module 306. The pattern generated at module 318 enables the custom configuration at module 320 on the calculator 310 to be monitored through a notification 322. The computing device 302 and the display surface 304 may be similar in structure and functionality to the computing device 102 and 202 and the display surface 104 and 204 as in FIGS. 1-2.

The modules 308 and 306 detect the selected functionality and create the custom configuration based on the selected functionality. The modules 308 and 306 may similar in functionality to the modules 208 and 206 of FIG. 2.

The calculator 310 includes the processor 316 of which the custom configuration 312 is integrated from the computing device 302 onto the calculator 310. The custom configuration 312 restricts the selected functionality of the calculator 310 at module 314. The selected functionality restricted at module 314 is detected at module 308 on the computing device 302. The calculator 310, the processor 316, and the custom configuration 312 may be similar in structure and functionality to the calculator 210, the processor 216, and the custom configuration 212 as in FIG. 2. The module 314 may be similar in functionality to the module 214 as in FIG. 2.

At module 318, the computing device 302 generates a pattern 318 with the custom configuration 306 included as part of the custom configuration 312 on the calculator 310. The computing device 302 generates the pattern at module 318 to monitor the custom configuration on the calculator 310 from a remote location without interfering with the calculator 310 while operating during an examination. In this embodiment, the pattern is generated at module 318 and transmitted to the calculator 310 as part of the custom configuration created at module 306. The pattern may be transmitted as signal, bit, communication, or data representing the unique identifier. Thus, the calculator 310 may receive the pattern and display visually or through audio as part of the integration of the custom configuration 312. For example, the pattern generated at module 318 may include a unique value, such as a series of numbers, thus once the calculator 310 integrates the custom configuration 312 the calculator may visually display a representation of the unique value through a light emitting diode(s) blinking the pattern of the unique value. Embodiments of the pattern generated at module 318 include a hashing value, cryptographic value, random value pattern, series value, or other type of unique identification as part of the custom configuration created at module 306 to monitor the custom configuration 312 on the calculator 310 at module 320. Embodiments of module 318 include a set of instructions, instruction, process, operation, logic, algorithm, technique, logical function, firmware, and or software executable by the computing device 302 to generate a pattern for monitoring the custom configuration on the calculator 310 at module 320.

At module 320 the calculator 310 receives he pattern generated at module 318 to monitor the custom configuration 312. In one embodiment module 320 includes the notification 322 to monitor the custom configuration 312 on the calculator 310. Monitoring the custom configuration 312 at module 320 enables an administrator to verify the calculator 310 is integrating the custom configuration 312 with the restricted functionality at module 314. Embodiments of module 320 include a set of instructions, instruction, process, operation, logic, algorithm, technique, logical function, firmware, and or software executable by the calculator 310 to monitor the custom configuration 312.

The notification 322 enables an external monitoring of the custom configuration at module 320. In one embodiment, the notification 322 is the pattern of notification which was generated at module 318. In this embodiment, the custom configuration is monitored externally at module 320 by emitting a pattern generated on the computing device 302 at module 318 through at least one of a light emitting diode (LED), visual display, audio data, and email. For example, the pattern generated at module 318 may be represented through the notification 322 as a series of visuals, such as the blinking LED to enable the administrator to monitor the custom configuration to verify the calculator is operating with the restricted functionality of the custom configuration 312.

Figure 4:
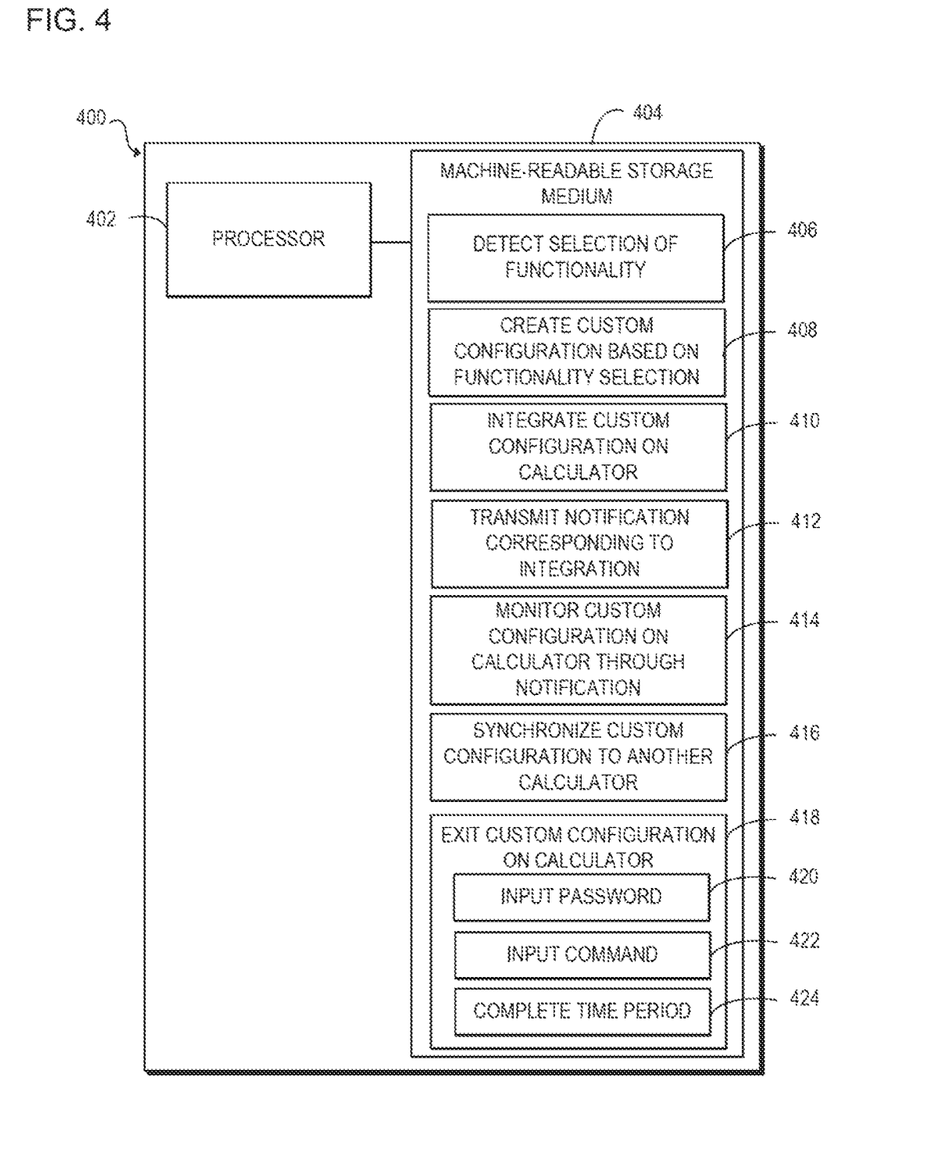
FIG. 4 is a block diagram of a computing device to detect a selected functionality to create a custom configuration to integrate onto a calculator, wherein the calculator exits the custom configuration by performing at least one of: inputting a password, inputting a command, and completing a time period.

FIG. 4 is a block diagram of example computing device 400 including a processor 402 to detect a selected functionality to create a custom configuration to integrate onto a calculator, wherein the calculator exits the custom configuration by performing at least one of: inputting a password, inputting a command, and completing a time period. Although the computing device 400 includes processor 402 and machine-readable storage medium 404, it may also include other components that would be suitable to one skilled in the art. For example, the computing device 400 may include the display surface 104, 204, and 304 as in FIGS. 1-3. Additionally, the computing device 400 may be similar in structure and functionality of the computing devices 102, 202, and 302 as in FIGS. 1-3, respectively.

The processor 402 may fetch, decode, and execute instructions 406, 408, 410, 412, 414, 416, 418, 420, 422, and 424. The processor 402 may be similar in functionality and structure to the processor 216 and 316 as in FIG. 1 and FIG. 3, respectively. Specifically, the processor 402 executes: instructions 406 to detect a selection of functionality; instructions 408 to create a custom configuration based on the selected functionality; instructions 410 to integrate the custom configuration on a calculator; instructions 412 to transmit a notification corresponding to the integration of the custom configuration on the calculator; instructions 414 to monitor the custom configuration on the calculator; instructions 416 to synchronize the custom configuration to another calculator; and instructions 418 to exit the custom configuration on the calculator by performing at least one of input password instructions 420, input command instructions 422, and complete time period instructions 424.

The machine-readable storage medium 404 may include instructions 406, 408, 410, 412, 414, 416, 418, 420, 422, and 424 for the processor 402 to fetch, decode, and execute. The machine-readable storage medium 404 may be an electronic, magnetic, optical, memory, storage, flash-drive, or other physical device that contains or stores executable instructions. Thus, the machine-readable storage medium 404 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 404 may include an application and/or firmware which can be utilized independently and/or in conjunction with the processor 402 to fetch, decode, and/or execute instructions of the machine-readable storage medium 404. The application and/or firmware may be stored on the machine-readable storage medium 404 and/or stored on another location of the computing device 400.

Instructions 406 detect the selected functionality from a list of functionalities to be disabled on the calculator. In one embodiment, instructions 406 include displaying a user interface to select the functionality. In another embodiment, instructions 406 include pressure detection for use as a touch screen to identify the selected functionality. In a further embodiment, instructions 406 include a coordinate type system to identify the selected functionality.

Instructions 408 create the custom configuration based on the functionality selected at instructions 406. In one embodiment, instructions 408 include creating the custom configuration from existing configurations. In another embodiment, instructions 408 include saving the custom configuration to a user-defined name.

Instructions 410 integrate the custom configuration on the calculator. In one embodiment, once the custom configuration has been integrated onto the calculator, a notification is transmitted to the administrator.

Instructions 412 transmit a notification corresponding to the integration of the custom configuration of instructions 410. The notification corresponds to either the success or issues with the integration of the custom configuration. Embodiments of the notification include email, audio notification, visual notification, or other type of notification transmitted to the administrator representing the status of the integration of the custom configuration on the calculator.

Instructions 414 monitor the custom configuration created and integrated on the calculator at instructions 408 and 410. In one embodiment, a pattern is generated at the creation of the custom configuration at instructions 408 and the custom configuration is monitored through a notification corresponding to the generated pattern. Embodiments of the notification corresponding to the generated pattern include a light emitting diode, visual display, audio data, and/or email. In these embodiments, the administrator may monitor the custom configuration from a remote location to the calculator, such as the front of the classroom to verify the calculator is operating in the examination mode with restricted functionality.

Instructions 416 synchronize the custom configuration to another calculator. In this embodiment, the custom configuration as created at instructions 408. In another embodiment, instructions 416 occur at similar time to the integration of the custom configuration at instructions 410. In this embodiment, the custom configuration may be transmitted among the calculators to enter the examination mode.

Instructions 418 exit the custom configuration as integrated and/or synchronized on the one or more calculators at instructions 410 and 416. In one embodiment instructions 418 exit the custom configuration on the calculator by performing at least one of instructions 422-424. Instructions 422-424 include the user-interface on the calculator and/or the computing device. Instructions 422-424 enable a flexibility of the custom configuration to exit the examination mode from one or more calculators. Exiting the custom configuration on the calculator, provides the flexibility to end the examination mode.

Instructions 420 enter a password as input to exit the custom configuration on the calculator. The password may be pre-defined by the administrator adding a level of security to the end of the examination mode.

Instructions 422 enter a command as direction to exit the custom configuration. In this embodiment, the command is entered on the computing device and/or the calculator to exit the custom configuration.

Instructions 424 complete a time period the custom configuration is configured on the calculator. In this embodiment, the user-interface may include a time period as input, thus when the time period is complete, the calculator exits the custom configuration. In another embodiment, instructions 424 include a pre-defined time period.

Figure 5:
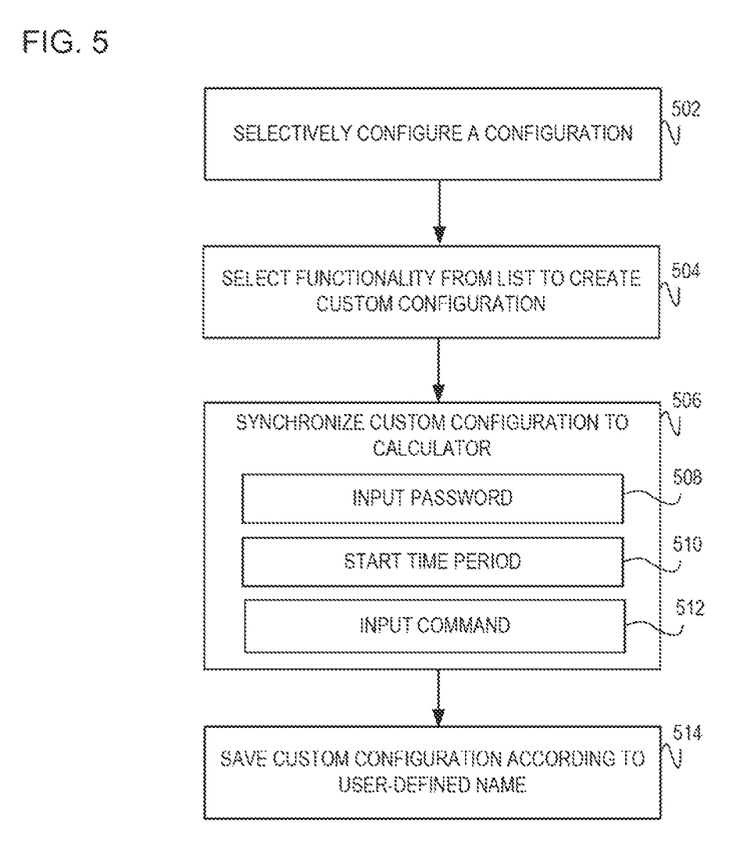
FIG. 5 is a flowchart of an example method performed on a computing device to selectively configure a configuration, select a functionality from a list of functionalities to disable to create a custom configuration from the selection of the configuration, synchronize the custom configuration to a calculator, and save the custom configuration according to a user-defined name.

FIG. 5 is a flowchart of an example method performed on a computing device to selectively configure a configuration, select a functionality from a list of functionalities to disable to create a custom configuration from the selection of the configuration, synchronize the custom configuration to a calculator, and save the custom configuration according to a user-defined name. Although FIG. 5 is described as being performed on computing device 102, 202, 302, and 408 as in FIGS. 1-4, it may also be executed on other suitable components as will be apparent to those skilled in the art. For example, FIG. 5 may be implemented in the form of executable instructions on a machine-readable storage medium, such as machine-readable storage medium 404 in FIG. 4.

At operation 502, the computing device selectively configures a configuration. In one embodiment, the configuration is selected among one or more pre-existing configurations.

At operation 504, the functionality is selected from a list of functionalities to be disabled on the calculator. Additionally, at operation 504, the custom configuration is created based on the selected functionality. The selected functionality is the functionality of which is to be disabled on the calculator. In one embodiment, a display surface of the computing device detects the selected functionality. In another embodiment, the custom configuration is created from the selected configuration at operation 502.

At operation 506, the computing device synchronizes to the calculator, the custom configuration created at operation 504. In one embodiment, operation 506 integrates the custom configuration onto the calculator. In another embodiment, the custom configuration is synchronized to another calculator. In this embodiment, the computing device at which the custom configuration is created at operation 504 operates as a type of master device, while the calculator at which to synchronize the custom configuration operates as slave device. For example, the computing device (i.e., master device) creates the custom configuration and transmits the configuration over a network to multiple calculators (i.e., slave devices) for operation in the examination mode. In a further embodiment, the custom configuration is synchronized to the calculator by performing at least one of operations 508-512. Operations 508-512 enable the custom configuration to he distributed among one or more calculators in efficient manner rather than manually configuring each calculator. In operations 508-512 a user interface may be displayed on the computing device and/or calculator to synchronize the custom configuration.

At operation 508, a password is used as input on either the computing device and/or calculator to synchronize the custom configuration to the calculator. The password may be pre-defined by the administrator adding a level of security to the custom configuration. For example, a user interface may be displayed on the computing device and/or the calculator and as such, may include enter the password. In another embodiment, the administrator may synchronize multiple calculators to the custom configuration through inputting a password, thus entering an examination mode for each calculator.

At operation 510, a time period is started to synchronize the custom configuration to the calculator. In this embodiment, the user-interface is displayed for the administrator to enter the time period. The time period may be pre-defined by the administrator so when the time period is completed, the calculator may exit the custom configuration.

At operation 512, a command is used as input on either the computing device and/or calculator to synchronize the custom configuration to the calculator. For example, the administrator may enter the command to synchronize the custom configuration for one or more calculators to enter the examination operation mode.

At operation 514, the custom configuration created at operation 504 is saved according to a user-defined name. In an embodiment, operation 514 occurs after the creation of the custom configuration at operation 504, while in another embodiment operation 504 saves the custom configuration once synchronizing to the calculator at operation 506. In these embodiments, the user-defined name is inputted once the custom configuration is created. This allows the administrator to pull up the custom configuration to integrate on more than one calculator, rather than manually configuring each individual calculator.

In summary, example embodiments disclosed herein provide an educational tool to create a custom configuration for one or more calculators in an examination mode. Further, example embodiments provide a customization which enables an administrator to tailor the examination mode according to the classroom and/or administrator preferences.

We claim:

1. A computing system comprising:
a computing device including a processor and a display surface, wherein the processor is to:
receive input corresponding to a selection of an academic subject;
detect a selection of a functionality from a list of functionalities corresponding to the selected academic subject, wherein the selected functionality restricts a calculator from performing the selected functionality during a test mode of the selected academic subject; and
create a custom configuration for restricting the selected functionality on the calculator during the test mode, the custom configuration based on the selected academic subject and the selected functionality.

2. The computing system of claim 1
wherein the computing device including the processor and the display surface, wherein the processor is further to:
detect a selection of a sub-functionality corresponding to the selected functionality, the selected sub-functionality a feature of the selected functionality to further customize the custom configuration.

3. The computing system of claim 1 wherein:
the computing device including the processor and the display surface, wherein the processor is further to:
generate a pattern associated with the custom configuration; and
the calculator with a processor is to:
receive the custom configuration from the computing device;
integrate the custom configuration on the calculator for restricting performance of the selected functionality during the test mode of the academic subject; and
upon integration of the custom configuration, emit a notification corresponding to the pattern wherein the notification enables the custom configuration to be monitored on the calculator.

4. The computing system of claim 1 wherein the computing device including the processor and the display surface, wherein the display surface is to display a notification to a user once the selected functionality is detected.

5. A non-transitory machine-readable storage medium encoded with instructions executable by a processor of a computing device, the storage medium comprising instructions to:
receive input corresponding to a selection of an academic subject;
detect a selection of a functionality from a list of functionalities corresponding to the selected academic subject, wherein the selected functionality restricts the calculator from performing the selected functional it during a test mode of the academic subject;

create a custom configuration for restricting the selected functionality on the calculator during the test mode based on the selected academic subject and the selected functionality; and transmit the custom configuration for integration on the calculator.

6. The non-transitory machine-readable storage medium including the instructions of claim 5, further comprising instructions to:

monitor the custom configuration on the calculator through a pattern of notifications, wherein the pattern is to be generated with the creation of the custom configuration and wherein the notifications includes at least one of: a light emitting diode, a visual display, an audio data, and email.

7. The non-transitory machine-readable storage medium including the instructions of claim 5, further comprising instructions to:

exit the custom configuration on the calculator by performing at least one of: inputting a password, a timeout, and inputting a command from the computing device.

8. The non-transitory machine-readable storage medium including the instructions of claim 5, further comprising instructions to:

transmit a notification corresponding to the integration of the custom configuration onto the calculator.

9. The non-transitory machine-readable storage medium including the instructions of claim 5, further comprising instructions to:

synchronize the custom configuration from the computing device to multi le calculators.

10. A method, executed by a computing device, the method comprising:

receiving input corresponding to a selection of an academic subject;

detecting a selection of a functionality from a list of functionalities corresponding to the selected academic subject, wherein the selected functionality restricts a calculator from performing the selected functionality during a test mode of the academic subject; and creating a custom configuration for restricting the selected functionality on the calculator during the test mode based on the selected academic subject and the selected functionality.

11. The method of claim 10 wherein creating the custom configuration is further comprising:

saving the custom configuration according to a user-defined name; and transmitting the custom configuration to multiple calculators for integration at each of the multiple calculators.

12. The method of claim 10 wherein the computing device operates as a master device to the calculator.

13. The method of claim 10 further comprising:

detecting to a selection of the custom configuration among multiple configurations; and detecting a selection of a sub-functionality corresponding to the selected functionality to further customize the custom configuration.

14. The method of claim 10 wherein transmitting the custom configuration to the multiple calculators occurs by performing at least one of: inputting a password, starting a time period, and inputting a command at the computing device.

15. The method of claim 10 wherein the functionality includes a list of corresponding sub-functionalities.

* * * * *

UNITED STATES PATENT AND TRADEMARK OFFICE
CERTIFICATE OF CORRECTION

PATENT NO.        : 9,043,376 B2                          Page 1 of 1
APPLICATION NO.   : 13/601835
DATED             : May 26, 2015
INVENTOR(S)       : Cyrille de Brebisson et al.

It is certified that error appears in the above-identified patent and that said Letters Patent is hereby corrected as shown below:

In the Claims,

In column 10, line 66, in Claim 5, delete "functional it" and insert -- functionality --, therefor.

In column 11, line 31, in Claim 9, delete "multi le" and insert -- multiple --, therefor.

In column 12, line 22 approx., in Claim 13, delete "to a" and insert -- a --, therefor.

In column 12, line 23 approx., in Claim 13, delete "multip1e" and insert -- multiple --, therefor.

Signed and Sealed this
Twenty-ninth Day of September, 2015

Michelle K. Lee
*Director of the United States Patent and Trademark Office*